United States Patent [19]
Dionnet et al.

[11] Patent Number: 5,355,318
[45] Date of Patent: Oct. 11, 1994

[54] METHOD OF MANUFACTURING A FRECTAL OBJECT BY USING STERIOLITHOGRAPHY AND A FRACTAL OBJECT OBTAINED BY PERFORMING SUCH A METHOD

[75] Inventors: Vincent Dionnet, Montrouge; Frederic Heliodore, Paris; Alain R. P. Le Mehaute, Gif Sur Yvette; Jean Claude Andre, Nancy, all of France

[73] Assignee: Alcatel Alsthom Compagnie Generale D'Electricite, Paris Cedex, France

[21] Appl. No.: 70,172

[22] Filed: Jun. 2, 1993

[30] Foreign Application Priority Data

Jun. 2, 1992 [FR] France ................ 92 06652

[51] Int. Cl.⁵ .............. G06F 15/46; B29C 41/22
[52] U.S. Cl. ................ 364/468; 364/474.24; 364/476; 395/119; 264/22; 156/275.5
[58] Field of Search .......... 364/468, 472, 473, 474.24, 364/476, 477, 474.05; 395/118–120, 128–130; 425/174.4, 162, 174; 264/22, 308; 156/275.5, 379.6

[56] References Cited

U.S. PATENT DOCUMENTS 5,189,626 2/1993 Colburn .................. 364/474.24
5,263,130 11/1993 Pomerantz et al. ........ 395/118

FOREIGN PATENT DOCUMENTS 0322257 6/1989 European Pat. Off. .
0463766 1/1992 European Pat. Off. .

Primary Examiner—Jerry Smith
Assistant Examiner—Steven R. Garland
Attorney, Agent, or Firm—Sughrue, Mion, Zinn, Macpeak & Seas

[57] ABSTRACT

The invention relates to methods of enabling fractal objects to be manufactured. In accordance with the invention, the method consists in performing repeated scaling reductions on a parent generator defined by means of three-dimensional coordinates, in storing the coordinates of each daughter object obtained by such a scaling reduction, and in repeating the scaling reduction until the dimensions of a daughter object become less than a given threshold value. The coordinates of the daughter objects are then supplied to stereolithographic apparatus which manufactures the fractal object defined by assembling together the daughter objects.

7 Claims, 6 Drawing Sheets

METHOD OF MANUFACTURING A FRECTAL OBJECT BY USING STERIOLITHOGRAPHY AND A FRACTAL OBJECT OBTAINED BY PERFORMING SUCH A METHOD

The invention relates to methods enabling fractal objects to be manufactured. Currently, no method exists for manufacturing such objects industrially. The term manufacturing corresponds to physically making the fractal object three-dimensionally.

As mathematical objects, fractal structures are known. They are defined as being self-similar structures having the same shape on both small and large scales. They have no characteristic length, and their dimensions are not integers (lying between 0 and 2).

Calculations have shown that fractal objects have characteristics that are very interesting for numerous fields. Numerous articles describe in particular their very specific electromagnetic wave propagation properties which lead to special wave-matter interaction modes. However, it has never been possible to verify these properties experimentally because it has been impossible for such objects to be physically made.

The problem of manufacturing them is particularly highlighted in FIG. 1. FIG. 1 is a front view of a fractal structure referred to as "Serpienski's mesh".

The mesh 10 is structured by means of three similar triangles 11, 12, and 13, referred to as "daughter triangles", each triangle constituting the scaling reduction of a parent triangle. The value of the ratio of the lengths of the sides between the parent triangle and the daughter triangles is ½, said value corresponding to the scale factor of parent triangle reduction.

The dimension Δ of the structure is given by the relationship:

$$\Delta = \frac{\log N}{\log E}$$

where N is the number of daughter triangles in the fractal object and E is the scale factor. The dimension Δ of the structure in FIG. 1 is substantially equal to 1.59 since the number of daughter triangles is 3 and the scale factor is 2.

Each daughter triangle 11, 12, and 13 is constituted by three triangles, e.g. 14, 15, and 16 for triangle 13. Triangles 14, 15, and 16 are the daughter triangles of triangle 13, which thereby in turn constitutes a parent triangle. Each one of triangles 14, 15, and 16 is in turn constituted by three daughter triangles, also constituted by daughter triangles, and so on until they become infinitely small.

If this structure is imagined in three dimensions, it is clear that no conventional machine tool could make this object, because a machine tool cannot penetrate inside an object so as to shape it. This applies to any three-dimensional fractal object, regardless of its shape.

In another field, stereolithography apparatus is known that enables models of industrial parts to be made. That apparatus is described in French patent application No. 84.11241 in the name of Compagnie Industrielle des Lasers Cilas Alcatel. That apparatus is shown in FIG. 2 and is referenced 20.

The apparatus 20 includes a system 21 of memories containing data representative of the shape of the industrial part to be made. It also includes a processing circuit 23 connected to the system 21 of memories and capable of using said data to deliver signals representative of the positions of elements of the volume of the part, the elements co-operating to form the entire volume of the part, said signals being delivered successively for a sequence of the elements ordered on the basis of horizontal scanning of the volume of the part. A tank 29 contains a volume of monomer 28 and the object to be made is manufactured in said tank 29. The apparatus 20 further includes a laser generator 22 for generating laser radiation, which generator is connected to the output of the processing circuit said radiation being suitable for causing the monomer liquid 28 to solidify by polymerizing when the liquid receives the radiation, and control means 27, constituted by motors and connected to the processing circuit 23, which control means respond to said signals by directing the laser radiation towards successive portions of the monomer liquid 28 in the tank 29 so that such portions are successively solidified to form the model of an industrial part standing on the bottom of the tank 29.

The laser radiation is guided by an optical fiber 24 engaged in a sleeve 25 forming a toothed rack with displacement means 26 controlled by the motor 27. The motor 27 displaces the end of the optical fiber 24 along a Z-axis that is perpendicular to the bottom of the tank 29. The motor 31 enables the end of the optical fiber to be displaced in a plane 30 that is parallel to the plane XY constituting the bottom of the tank 29.

The transmission wavelength of the laser 22 is such that the laser radiation causes the monomer liquid contained in the tank to be polymerized, polymerization occurring only in the vicinity of the point where the radiation enters the liquid 28.

The end of the optical fiber 24 held in the sleeve 25 scans the volume of the tank by following the horizontal bottom of the tank 29, so that all the portions of the industrial model are constructed step by step and successively. At each position increment along the Z-axis, a certain quantity of monomer liquid is fed into the tank, so that the layers that are already polymerized are just covered, and a new scan cycle can then be performed. At the start of manufacture, a portion of the model is solidified to serve as a stable base for the successive layers.

Other stereolithographic apparatuses exist, such as those described in French patent applications 85.09054 and 85.09055 in the name of the same Applicant.

In the first of those patent applications, a viscous material containing a monomer resin is deposited on a horizontal plate by means of an injector. The injector is displaced during deposition by using horizontal scanning in superposed horizontal planes starting from the plate, and the viscous material is solidified after it leaves the injector. The flow-rate of the viscous material is synchronized with the displacement of the injector so that, at the end of scanning, the solidified viscous material forms a model whose shape is identical to the shape defined in a data memory accessed by a control device for controlling the injector, its flowrate and its displacement. Solidification may be performed either by illuminating the viscous material after it leaves the injector, or by making the material thixotropic.

In the second of those patent applications, the injector deposits a first liquid in a tank containing a second liquid. The first liquid is, for example, a photochemical primer suitable for causing the second liquid constituted by a monomer resin to solidify by illuminating said second liquid.

Generally speaking, all such stereolithographic apparatuses include the same basic components, namely:
- a data memory defining the shape of the object to be manufactured;
- a control device which controls the displacement of generation means for generating the object to be manufactured, as a function of the data stored in the memory, the generation means being constituted either by:
  - a laser beam associated with a monomer liquid;
  - a viscous-material injector associated with a horizontal plate and also with optical radiation; or
  - an injector for injecting a first liquid which reacts with a second liquid present in a tank, the injector also being associated with optical radiation.

The common denominator between methods of manufacturing models is, therefore, that generation means for generating the model to be made perform horizontal scanning associated with a step in which a substance is set, said scanning enabling the model to be built up layer by layer.

A particular object of the present invention is to provide a method of manufacturing three-dimensional physical fractal objects.

Another object of the invention is to provide a three-dimensional fractal object obtained by such a method.

These objects, and others that appear below, are achieved by means of a method of manufacturing three-dimensional fractal objects, said method being characterized in that it consists in:
- defining a parent generator object by means of three-dimensional data defining its outside shape;
- performing three-dimensional scaling reduction on the parent generator object so as to reduce it by N, where N is an integer, the reduction supplying daughter objects whose positions are defined relative to said parent generator object, each of the daughter objects being defined by data enabling it to be situated three-dimensionally relative to the parent generator object;
- repeating the scaling reduction for each of the daughter objects obtained by each scaling reduction until the dimensions of the daughter objects obtained by reduction become less than a given threshold value (epsilon); and
- supplying at least part of the data enabling the daughter objects to be situated relative to the parent generator object to a control device for controlling stereolithographic apparatus which manufactures the fractal object.

The method of the invention is therefore based on a scaling reduction of a parent generator, the reduction being performed in all three dimensions. The positions of the daughter objects obtained are defined relative to the parent generator.

Advantageously, the control device uses the data to supply signals representative of the positions of elements making up the structure of the fractal object, the elements co-operating with one another to form the entire structure of the fractal object, the signals being supplied successively so as to define the fractal object layer by layer both to displacement means for displacing generator means for generating the fractal object, and also to the generator means so that the generator means manufacture each layer of the fractal object in successive horizontal layers, the control device also generating signals representing linking means for linking isolated daughter objects such that the isolated daughter objects are interconnected in the planes of the layers.

Preferably, said data is constituted by a list of edges and/or vertices and/or planes locating each daughter object relative to said parent generator object.

Advantageously, said signals representing linking means control said generator means such that said linking means are constituted by a horizontal grid on which said daughter objects stand.

Therefore, the signals are generated by the control device which usually contains CAD software.

In a preferred embodiment, said generator means for generating said fractal object are constituted by laser radiation suitable for causing a monomer liquid contained in a tank to solidify by polymerization, said control device responding to said signals by directing said laser radiation towards successive portions of said monomer liquid so that the portions are successively solidified to form said fractal object standing on the bottom of said tank.

The present invention also provides a fractal object obtained by using such a method, the fractal object preferably being pyramid-shaped.

In a particular embodiment the daughter objects of the fractal object are inverted pyramids.

Other characteristics and advantages of the invention will appear on reading the following description of a preferred embodiment given by way of non-limiting example and with reference to the accompanying drawings, in which:

DETAILED DESCRIPTION OF THE INVENTION

Figure 1:
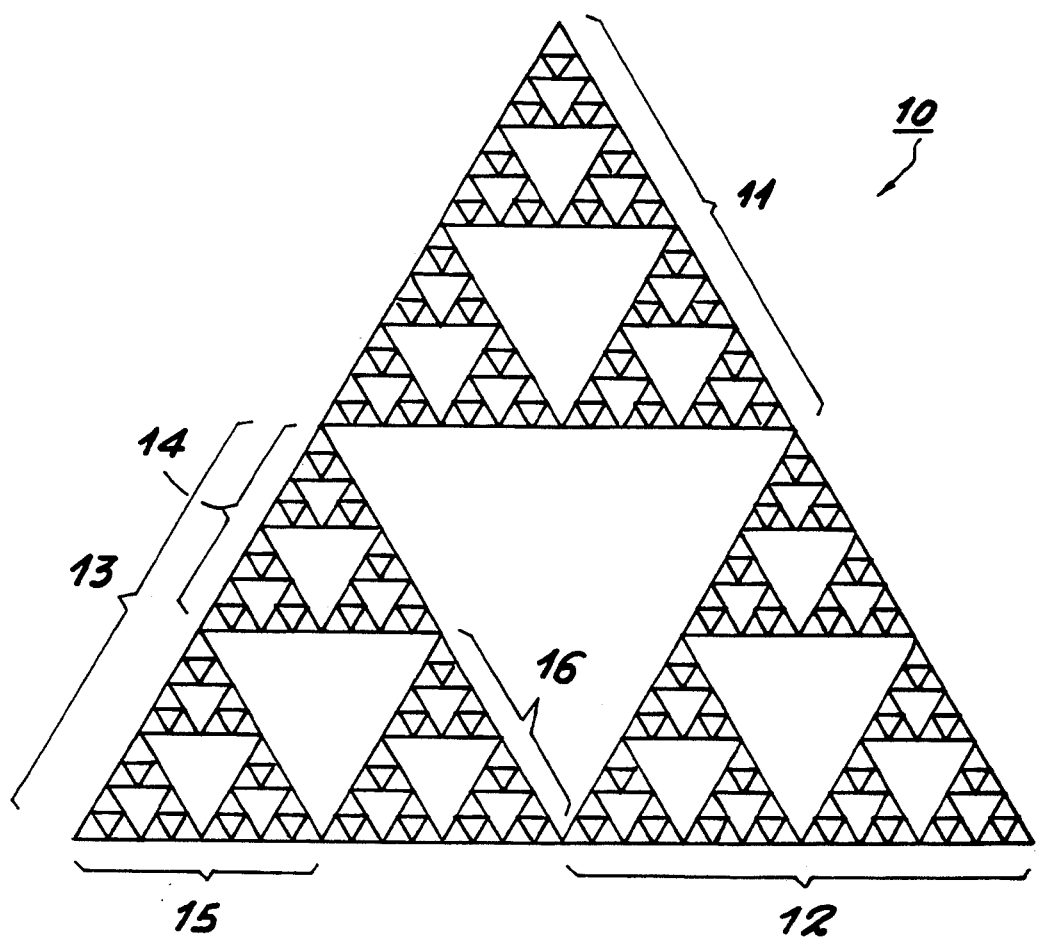
FIG. 1 shows a known fractal structure referred to as "Serpienski's pyramid"
Figure 2:
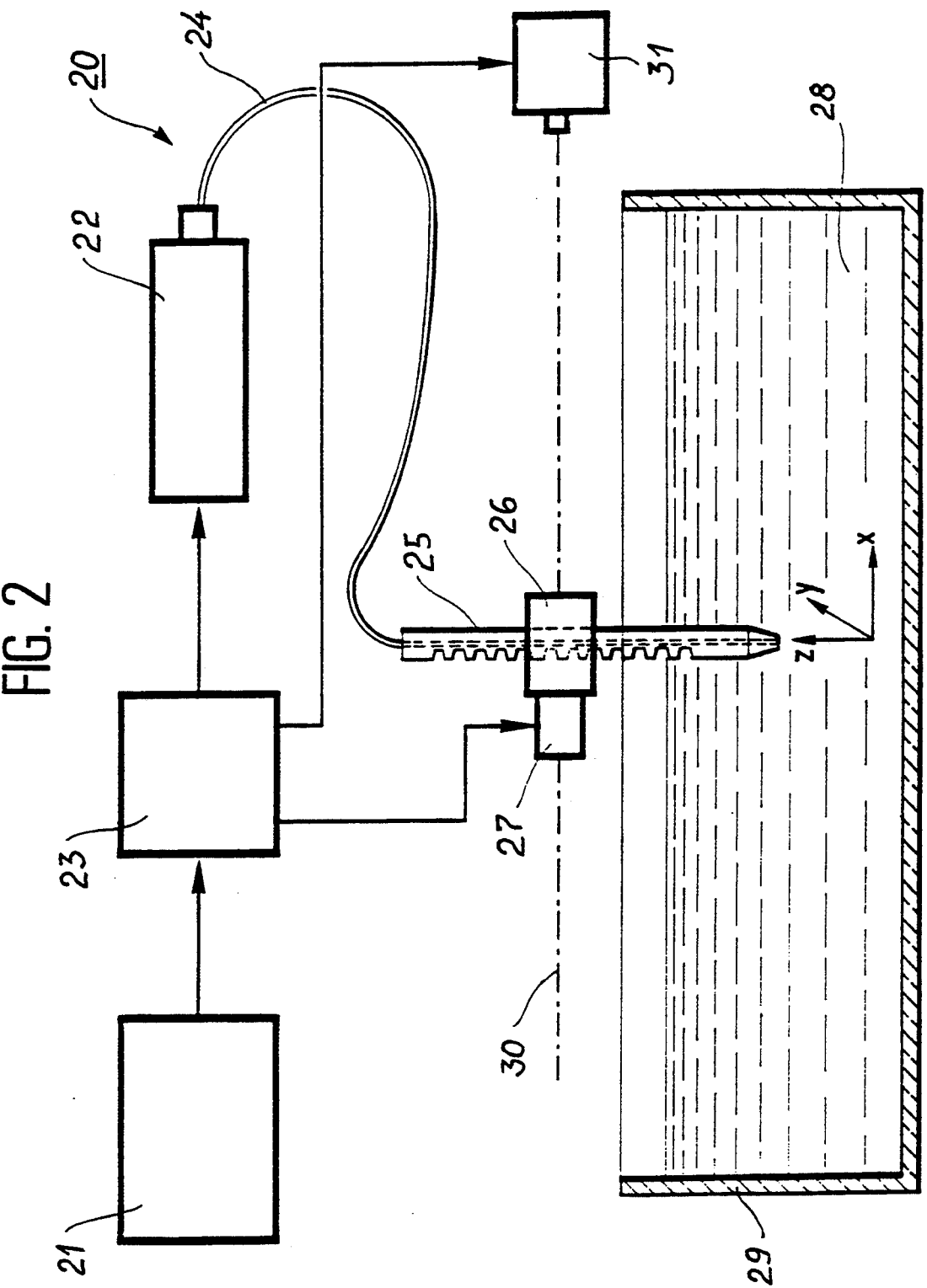
FIG. 2 shows stereolithographic apparatus of known type.

FIGS. 1 and 2 are described above with reference to the state of the art.

It appeared to the inventors that the stereolithographic apparatus shown in FIG. 2 could be used advantageously for manufacturing fractal objects. Since the model of the industrial part is built up layer by layer, it is possible to shape the inside of any object, the minimum thickness of an arbitrary point of the object being a function of the diameter of the laser beam. Therefore, the smaller the diameter of the beam, the thinner a polymer layer and the higher the resolution. A correctly-focused laser beam therefore makes it possible to polymerize very small regions of liquid monomer, and it is then possible for small daughter objects to be physically constructed.

This characteristic is advantageous for a fractal object insofar as a theoretical fractal object (a fractal structure) includes an infinite number of sub-patterns (daughter structures) of ever smaller size. A narrow laser beam makes it possible to obtain three-dimensional definition of the order of 100 μm.

The method of the invention is described below with reference to FIGS. 3 to 8 which show the various steps of generating daughter objects from a parent generator constituted by a pyramid. Below, a parent generator is defined as being the three-dimensional starting object from which all the daughter objects are created.

The method of the invention uses three-dimensional definition software for defining a fractal object three-dimensionally. The purpose of the software is to supply data defining the shape of the fractal object, which object is made up of a plurality of daughter objects themselves obtained by performing scaling reduction on a parent generator.

Figure 3:
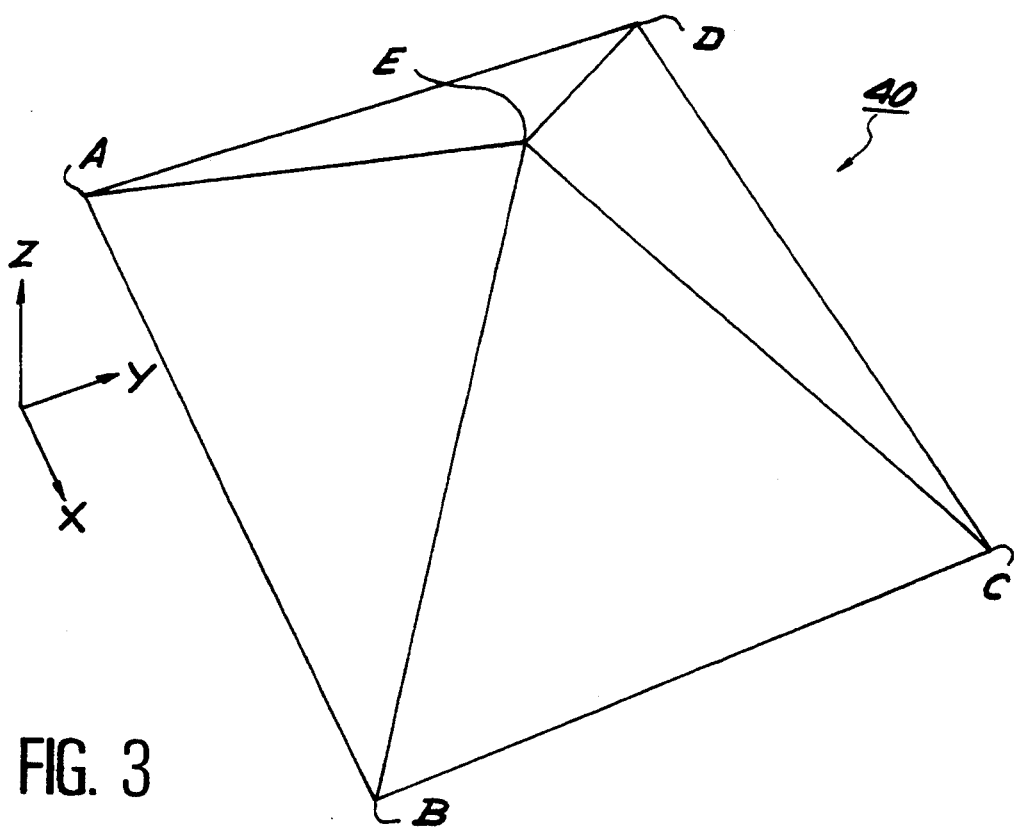
FIG. 3 is a perspective view of a parent generator serving as a reference structure and on which a first scaling reduction is performed.

The first step of the method consists in defining a parent generator constituted, in the example in question, by a square-based pyramid, such as shown in perspective in FIG. 3. The parent generator has four sides referenced A, B, C, and D, and a vertex E.

Certain portions of fractal object definition software, written in Pascal, are given below to supplement the description of the figures.

The creation procedure for creating the parent generator is as follows:

```
AllocatePoint(A,0,0,0,);
AllocatePoint(B,10,0,0);
AllocatePoint(C,10,10,0);
AllocatePoint(D,0,10,0);
AllocatePoint(E,5,5,10);
CreatePyramidShape
    (CurrentItem^^.F,A,B,C,D,E);
AllocatePyra (P,A,B,C,D,E);
Process_Pyramid (P,CurrentItem);
CurrentItem:=BaseListItem;
if InterFile then
begin
    CreateInterfile;
end;
```

The AllocatePoint procedure is as follows: procedure AllocatePoint (var Pt:pointR3D; x,y,z:real);

```
begin
    Pt.X:=x;
    Pt.Y:=y;
    Pt.Z:=z;
end;
```

The variable PointR3D is a point defined by three coordinates. Three coordinates are allocated to each of the points A to E to enable the points to be situated in a three-dimensional space. The numerical values correspond, for example, to centimeters, and the pyramid defined in this way has a square base with sides of 10 cm, and has a height of 10 cm.

InterFile is a file in which all the coordinates of the three-dimensional structures defined by the software are stored.

Once the parent generator has been defined, a procedure for defining the fractal object is run. This procedure is referred to a Process_Pyramid: procedure Process_Pyramid (p:pyramid; vat h:hdlItem);

var
  Ta, Tb, Tc, Td, Te, Tf, Tg, Th, Ti, Tj, Tk, Tl, Tm, Tn: PointR3D;
  P1:pyramid;

begin $$Ta:=P.A; \tag{1}$$

Tb:=P.B;

Tc:=P.C;

Td:=P.D;

The:=P.E;

Tf:=Seg_Middle(P.A,P.C);

Tg:=Seg_Middle(P.A,P.D);

The:=Seg_Middle(P.A,P.B);

Ti:=Seg_Middle(P.B,P.C);

Tj:=Seg_Middle(P.C,P.D);

Tk:=Seg_Middle(P.E,P.A);

Tl:=Seg_Middle(P.E,P.B);

Tm:=Seg_Middle(P.E,P.C);

Tn:=Seg_Middle(P.E,P.D);

$$h^{\wedge\wedge}.Follow:=CreateItem \tag{2}$$

h:=h^^Follow;

CreatePyramidShape(h^^.F,tk,tl,tm,tn,tf);

This portion of procedure which uses the Seg_Middle function (sequence of instructions No. 1), and calculates the coordinates of the points situated in the middles of the straight-line segments present between two points of the parent generator constituted by the pyramid shown in FIG. 3. The scaling reduction ratio for the generator is therefore ½. Naturally, this ratio may be different. This procedure also uses a CreatePyramidShape procedure (sequence of instructions No. 2) which makes it possible to store the shape of an inverted pyramid and the position thereof relative to the parent generator, in fact relative to the intersection between the X, Y, and Z axes in FIG. 3, in the InterFile memory. In this embodiment, only the inverted pyramids are actually manufactured, and therefore only data concerning such pyramids are stored. The CreatePyramidShape procedure is described below.

The procedure continues as follows:

if (abs(th.x−ta.x)>epsilon) then         (3)

begin

AllocatePyra(P1,Ta,Th,Tf,Tg,Tk);         (4)

Process_Pyramid(P1,h);

AllocatePyra(P1,Th,Tb,Ti,Tf,Tl);         (5)

Process_Pyramid(P1,h);

AllocatePyra(P1,Tf,Ti,Tc,Tj,Tm);         (6)

Process_Pyramid(P1,h);

AllocatePyra(P1,Tg,Tf,Tj,Td,Tn);         (7)

Process_Pyramid(P1,h);

AllocatePyra(P1,Tk,Tl,Tm,Tn,Te);         (8)

Process_Pyramid(P1,h);

end;

end;

Sequence of instructions No. 3 is a test on which the continuation of scaling reduction depends. In the present example, it is verified that the distance along the X-axis between the vertex of the inverted pyramid and the point A serving as a reference is greater than a predefined threshold value epsilon. Therefore epsilon corresponds to a minimum distance to be kept between any two points of the fractal object in the plane XY.

At best, when a laser is used to polymerize a monomer liquid as shown in FIG. 2, the value of epsilon corresponds to the area presented by the laser radiation. If the stereolithographic apparatus is of the same type as those in above-described French patent applications 85.09054 and 85.09055, epsilon corresponds to the diameter of the injector. The pitch in the Z direction is set by the CAD software contained in the control device for controlling the generation means for generating the object. For example, the pitch may be 50 μm. However the generation means are preferably constituted by a laser beam illuminating a monomer liquid, since this manufacturing technique is tried and tested.

Processing steps 4 to 8 constitute processing loops whose purpose is to define the coordinates of all the inverted pyramids that are calculated by recursion and that satisfy the condition imposed by the value of epsilon. Each parent object is subjected to an internal scaling reduction so as to generate a daughter object, each daughter object being subjected to the same processing until the value epsilon is reached. The procedure then moves on to the inverted pyramid that is situated next to the last-processed pyramid, which is the last daughter pyramid, i.e. the smallest pyramid. Naturally, it is possible to use a different method to calculate the coordinates of each daughter object, e.g. the coordinates of all the daughter objects (five in all) from the same parent object can be calculated.

At the end of processing steps 4 to 8, the coordinates of all the inverted pyramids, regardless of their size, are stored in InterFile. In the present example, given the shape of a pyramid, five processing steps are necessary since each parent pyramid is constituted by five daughter pyramids.

Figure 4:
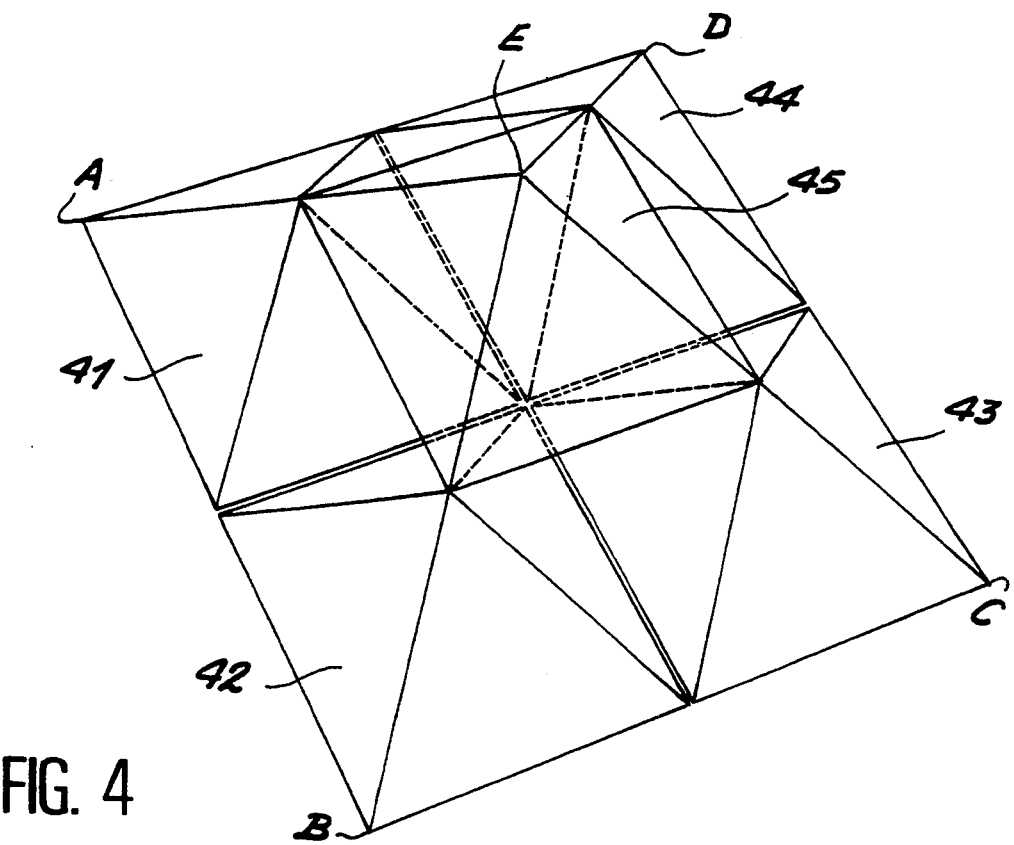
FIG. 4 shows the result of a first scaling reduction step performed on the parent generator shown in FIG. 3.
Figure 5:
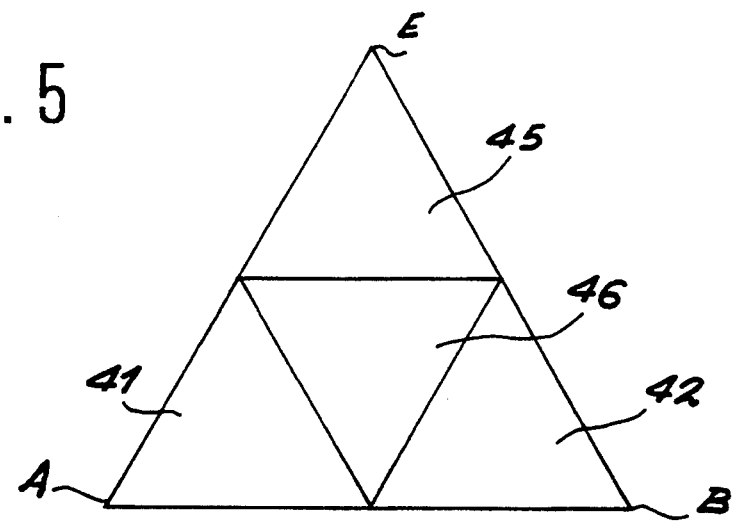
FIG. 5 is a front view of the fractal object shown in FIG. 4.

FIG. 5 is a front view of the pyramid shown in FIG. 4. The face delimited by points A, B, and E is shown. The three other faces of the object defined in this way are identical. Therefore, this object is a fractal object.

For example, pyramids 41, 43, and 45 may be empty with only their edges being made by the stereolithographic apparatus. They may alternatively be provided with solid faces.

In a preferred embodiment, the five pyramids that are generated are hollow, and they do not have solid faces. This configuration may be achieved by the CAD means splitting up the object shown in the form of point coordinates into successive slices.

Under pyramid 45 there is an inverted pyramid 46. Pyramid 46 is shown in perspective in FIG. 6. It has solid faces connecting its base to its vertex, and it is hollow inside. Since its base is directed towards the vertex E of the fractal object, said inverted pyramid forms what can be likened to an antenna.

In a preferred embodiment of the method of the invention, all the pyramids which are to be actually made by the stereolithographic apparatus are inverted pyramids. The scaling reductions are performed on the daughter structures of the parent structure shown in FIG. 3, but with each iteration, only the inverted pyramid that is situated between the five pyramids obtained is stored so as to be physically constructed. Naturally other embodiments are possible.

This embodiment of the method of the invention amounts to considering the largest inverted pyramid as being a parent generator. To this extent, defining the inverted pyramid-shaped parent generator is not part of the method of the invention, and the data enabling it to be defined is input in the same way as the data making it possible to indicate the shape of the pyramid 40 shown in FIG. 3. In this embodiment, the fractal object manufactured is used for electromagnetic wave absorption testing, for example, since the shape of the resulting antenna lends itself to this use.

Figure 6:
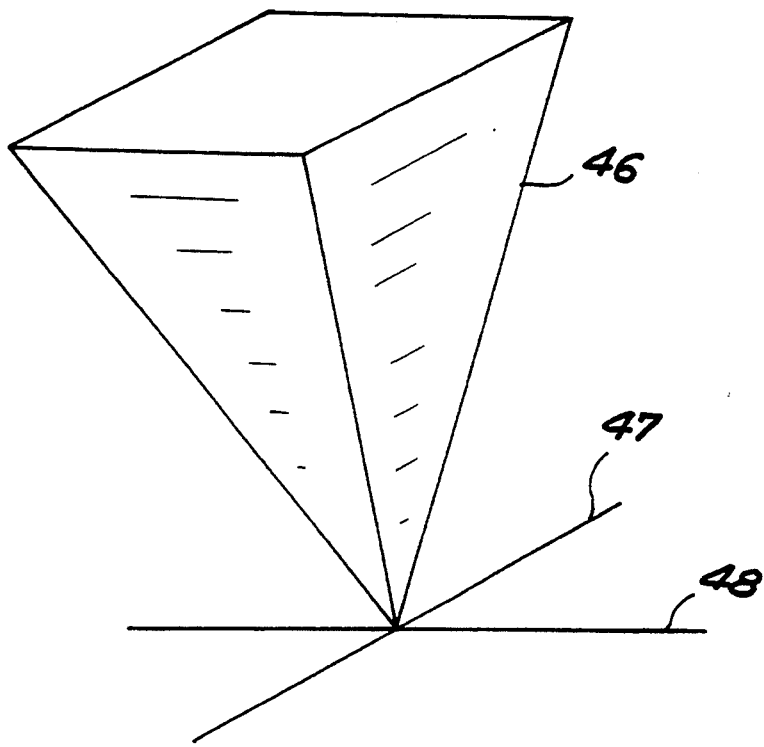
FIG. 6 is a perspective view of an inverted pyramid structure having solid faces, and whose coordinates are calculated by the software which is part of the method of the present invention, it being possible for the pyramid to be physically constructed by the stereolithographic apparatus shown in FIG. 2.

Therefore, it is possible to consider that the parent generator is constituted by a pyramid such as that shown in FIG. 5, including an inverted pyramid having solid faces. However, since only the inverted pyramids are physically constructed after scaling reduction, the generator is in fact constituted by the inverted pyramid having solid faces that is shown in FIG. 6.

Furthermore, when defining a fractal object that is to be manufactured by stereolithographic apparatus, it is necessary to ensure that all the elements that are defined, i.e. all the daughter objects, are connected together. If one of the daughter objects defined by calculation is not physically linked to another object, it cannot be part of the final fractal object. Therefore, the daughter objects are linked together by link means constituted, for example, by straight-line segments made by the stereolithographic apparatus.

For example, the straight-line segments may be included automatically in the fractal object by the CAD software when the object is being manufactured.

In particular, the CAD software constituting the control device for controlling the generation means, makes such straight-line segments prior to manufacturing the fractal object, so that the fractal object stands on a support plate on the bottom of the tank containing the monomer liquid. The support is constituted, for example, by a grid including a first set of parallel segments intersecting a second set of parallel segments at right angles. In the embodiment of the invention, such a grid is present under pyramid 40 and at each level where the vertices of the smallest daughter pyramids stand. More precisely, each vertex of an arbitrary one of the pyramids stands on a right-angle intersection between two straight-line segments.

The link means may also be defined by the software of the present invention, e.g. by using the following procedure:

if MakeGrid then begin

F.Vertex[5]:=Seg_Middle(A,B);

F.Vertex[5].z:=E.z;

F.Vertex[6]:=Seg_Middle(B,C);

F.Vertex[6].z:=E.z;

F.Vertex[7]:=Seg_Middle(C,D);

F.Vertex[7].z:=E.z;

F.Vertex[8]:=Seg_Middle(D,A);

F.Vertex[8].z:=E.z;

F.NumVertices:=9;

F.Edges[8,0]:=5;

F.Edges[8,1]:=7;

F.Edges[9,0]:=6;

F.Edges[8,1]:=8;

F.NumEdges:=10;

end;

end;

AllocatePyra(P,A,B,C,D,E);

Process_Pyramid (P,CurrentItem);

CreateInterFile end;

Therefore, the vertices of the inverted pyramids stand on the intersections between straight-line segments, which intersections are physically constructed by the generation means for generating the fractal object, the straight-line segments forming a grid provided by the software of the method of the present invention.

The maintaining means may also be constituted by straight-line segments that are part of the parent generator. This embodiment is represented by the right-angle cross-pieces 47 and 48 shown in FIG. 6. The scaling reductions of this structure, then considered as being a parent generator, supply daughter objects whose cross-pieces are disposed end-to-end so as to form a continuous grid also giving the fractal object a certain amount of mechanical strength. Naturally, the cross-pieces must be long enough for two cross-pieces adjacent to daughter objects to be connected together while the object is being manufactured, i.e. arrive at the same point.

The Process_Pyramid procedure also uses an AllocatePyra procedure which is as follows: procedure AllocatePyra (var P:Pyramid;a,b,c,d,e:pointR3D);

begin

P.a:=a;

P.b:=b;

P.c:=c;

P.d:=d;

P.e:=e;

end;

The Seg_Middle function used is as follows: function Seg_Middle (A,B:pointR3D):pointR3D;
var
C:pointR3D;

begin

C.x:=A.X+(B.x−A.x)/2;

C.y:=A.Y+(B.y−A.y)/2;

C.z:=A.Z+(B.z−A.z)/2;

Seg_Middle:=C;

end;

In this way, this function calculates the middle of each segment connecting together two points under consideration. Here to the scaling reduction ratio is ½. The scaling reduction is always 1/N, where N is an integer (N=2, 3, 4 ...).

The Process_Pyramid procedure also uses a CreatePyramidShape procedure: procedure CreatePyramidShape (var F:Shape; A,B,C,D,E: PointR3D);

begin

F.Vertex[0]:=A;

F.Vertex[1]:=B;

F.Vertex[2]:=C;

F.Vertex[3]:=D;

F.Vertex[4]:=E;

F.NumVertices=:5;

This procedure portion allocates a number to each of the points A to E. It continues as follows:

{edges of the base of the pyramid}

F.Edges[0,1]:=0; {edge A,B}

F.Edges[0,1]:=1;

F.Edges[1,0]:=1; {edge B,C}

F.Edges[1,1]:=2;

F.Edges[2,0]:=2; {edge C,D}

F.Edges[2,1]:=3;

F.Edges[3,0]:=0; {edge A,D}

F.Edges[3,1]:=3;

Each pair of instructions allocates an edge number to each segment connecting two points on the base of the pyramid. In this way, edges A,B; B,C; C,D; and A,D have respective numbers 0, 1, 2, and 3.

This operation is also performed for the edges including to the vertex E of the pyramid:

F.Edges[4,0]:=0; {edge A,E}

F.Edges[4,1]:=4;

F.Edges[5,0]:=1; {edge B,E}

F.Edges[5,1]:=4;

F.Edges[6,0]:=2; {edge C,E}

F.Edges[6,1]:=4;

F.Edges[7,0]:=3; {edge D,E}

F.Edges[7,1]:=4;

F.NumEdges:=8; {8 edges in all}

Finally, the four faces of the pyramid are numbered:

F.Faces[0,0]:=0; {face A,B,E}

F.Faces[0,1]:=4;

F.Faces[0,2]:=5;

F.Faces[1,0]:=1; {face B,C,E}

F.Faces[1,1]:=5;

F.Faces[1,2]:=6;

F.Faces[2,0]:=2; {face C,D,E}

F.Faces[2,1]:=6;

F.Faces[2,2]:=7;

F.Faces[3,0]:=3; {face A,D,E}

F.Faces[3,1]:=4;

F.Faces[3,2]:=7;

F.NumFaces:=4; {4 faces in all}

It is possible to store the shapes and the positions of the daughter objects by using data corresponding to points, straight-line segments and/or planes. In a preferred embodiment, only points are stored, and the CAD software contained in the stereolithographic apparatus automatically generates straight-line segments or solid planes on the basis of the data constituted by point coordinates. For example, InterFile corresponds to the memory 21 in FIG. 2.

Figure 7:
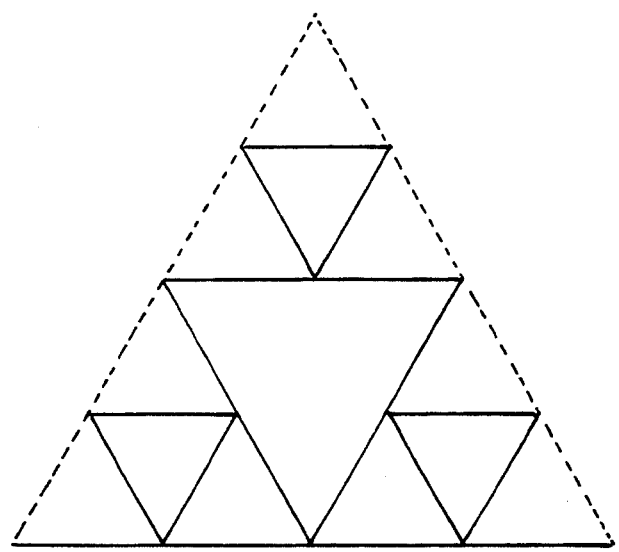
FIG. 7 is a front view of a fractal object constituted by inverted pyramids whose positions are calculated by the software, the inverted pyramids being physically constructed by the stereolithographic apparatus, and the object being obtained after a scaling reduction has been performed on the inverted pyramid shown in FIG. 6.
Figure 8:
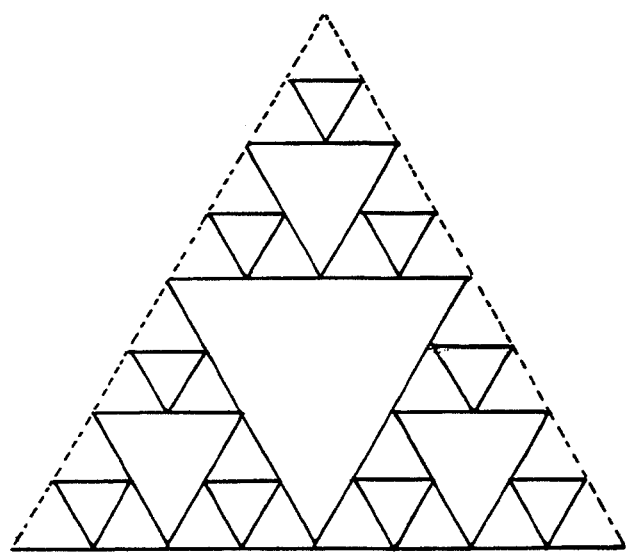
FIG. 8 is a front view of a fractal object resulting from an additional scaling reduction being performed on the structure shown in FIG. 6.

FIGS. 7 and 8 are two front views of two fractal objects obtained for different values of epsilon. FIG. 7 shows the results obtained for one recursion (scaling reduction) of a daughter pyramid of the object shown in FIG. 5, and FIG. 8 shows the result obtained for one additional recursion. The edges of the parent generator are represented by dashed lines because they cannot be physically constructed. In this example, only the inverted pyramids are physically constructed, with their vertices standing, for example, on cross-pieces such as described with reference to FIG. 6.

Laboratory tests using laser radiation which polymerizes a monomer liquid present in a tank, make it possible to obtain fractal objects of this type having sides of 10 cm and being 10 cm high, the objects being constituted by daughter pyramids resulting from five successive recursions of the largest inverted pyramid, which may therefore be considered to constitute a parent generator.

Figure 9:
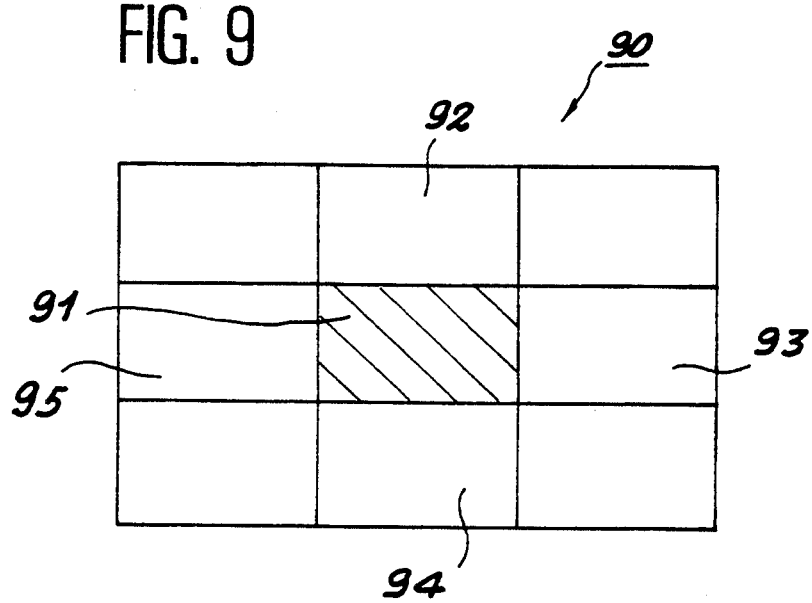
FIG. 9 is a front view of another parent generator.

Naturally, the method of the invention also applies to manufacturing other fractal objects, e.g. those resulting from a generator such as that shown in FIG. 9.

FIG. 9 is a front view of a parent generator 90 constituted by a "brick" provided with a rectangular central orifice 91 which is hatched in the figure.

Figure 10:
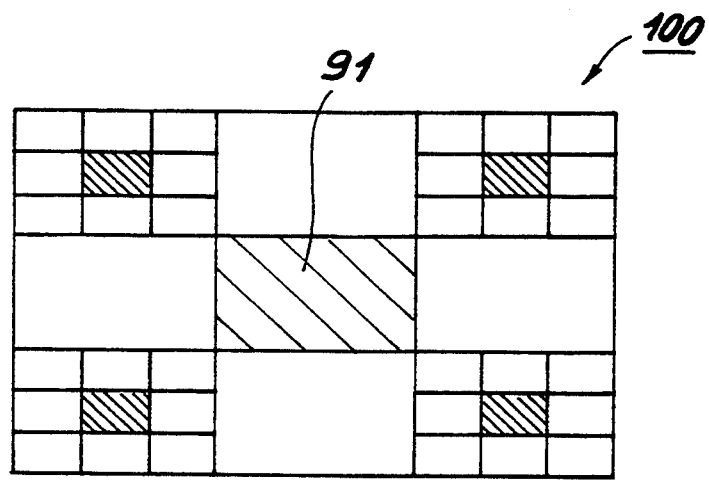
FIG. 10 is a front view of a fractal object obtained as a result of a scaling reduction being performed on the generator shown in FIG. 9.

FIG. 10 shows an example of a fractal object obtained after scaling reduction has been performed on the parent generator 90, the daughter objects being staggered relative to the orifice 91. Naturally the daughter objects could be placed in locations 92 to 95 (FIG. 9). Therefore, each daughter object has the same shape as the parent generator 90, and the successive scaling reductions of the daughter objects can be continued, until the definition limit imposed by the stereolithographic apparatus is reached.

Naturally shape generator may also be performed by using silk screen printing, e.g. by means of a "CUBITAL" (protected name) machine. In which case, the generation means is constituted by a screen-printing tool.

We claim:

1. A method of manufacturing three-dimensional fractal objects, said method being characterized in that it consists in:

defining a parent generator object (40, 46, 90) by means of three-dimensional data defining its outside shape;

performing three-dimensional scaling reduction on the parent generator object (40, 46, 90) so as to reduce it by N, where N is an integer, said reduction supplying daughter objects (41, 42, 43, 44, 45, 46) whose positions are defined relative to said parent generator object (40, 46, 90), each of said daughter objects (41, 42, 43, 44, 45, 46) being defined by data enabling it to be situated three-dimensionally relative to said parent generator object (40, 46, 90);

repeating said scaling reduction for each of said daughter objects (41, 42, 43, 44, 45, 46) obtained by each scaling reduction until the dimensions of said daughter objects obtained by reduction become less than a given threshold value (epsilon); and supplying at least part of said data enabling said daughter objects (41, 42, 43, 44, 45, 46) to be situated relative to said parent generator object (40, 46, 90) to a control device (23) for controlling stereolithographic apparatus which manufactures said fractal object.

2. A method according to claim 1, characterized in that said control device (23) uses the data to supply signals representative of the position of elements making up the structure of said fractal object, the elements cooperating with one another to form the entire structure of said fractal object, the signals being supplied successively so as to define said fractal object layer by layer both to displacement means (27, 31) for displacing generator means (22) for generating said fractal object, and also to the generator means (22) so that said generator means (22) manufacture each layer of said fractal object in successive horizontal layers, said control device (23) also generating signals representing linking means (47, 48) for linking isolated daughter objects such that said isolated daughter objects are interconnected in the planes of said layers.

3. A method according to claim 1, characterized in that said data is constituted by a list of edges and/or vertices and/or planes locating each daughter object relative to said parent generator object (40, 46, 90).

4. A method according to claim 2, characterized in that said signals representing linking means (47, 48) control said generator means (22) such that said linking means (47, 48) are constituted by a horizontal grid on which said daughter objects (41, 42, 43, 44, 45, 46) stand.

5. A method according to claim 2, characterized in that said generator means for generating said fractal object are constituted by laser radiation (22) suitable for causing a monomer liquid (28) contained in a tank (29) to solidify by polymerization, said control device (23) responding to said signals by directing said laser radiation (22) towards successive portions of said monomer liquid (28) so that the portions are successively solidified to form said fractal object standing on the bottom of said tank (29).

6. A fractal object obtained by using a method according to claim 1, characterized in that it is pyramid-shaped.

7. A fractal object according to claim 6, characterized in that said daughter objects are inverted pyramids (46).

* * * * *